No. 759,805. PATENTED MAY 10, 1904.
W. W. BROGA.
SNAP HOOK.
APPLICATION FILED SEPT. 14, 1903.
NO MODEL.
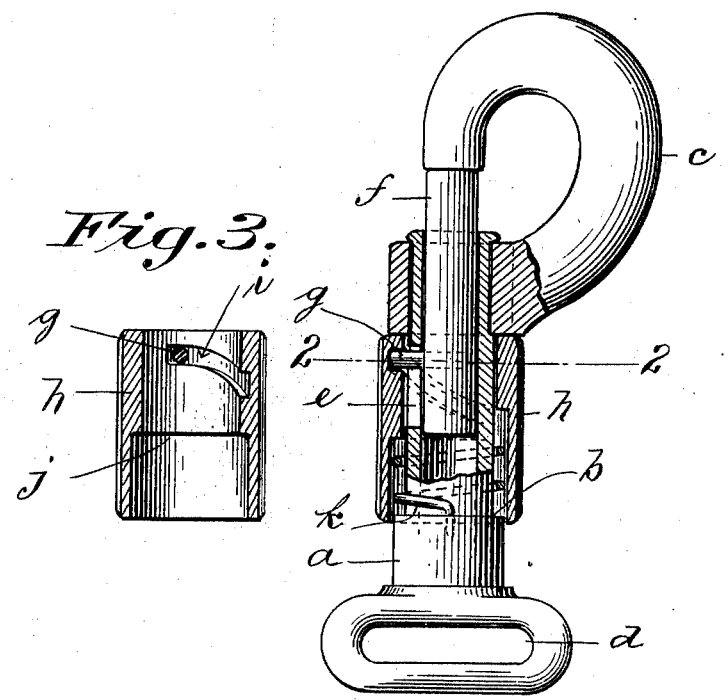
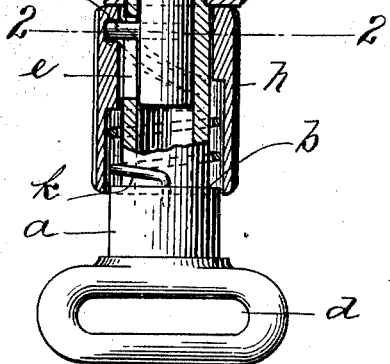
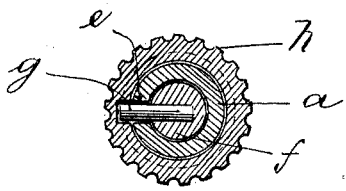

No. 759,805.

Patented May 10, 1904.

UNITED STATES PATENT OFFICE.

WILLIAM W. BROGA, OF SPRINGFIELD, MASSACHUSETTS.

SNAP-HOOK.

SPECIFICATION forming part of Letters Patent No. 759,805, dated May 10, 1904.

Application filed September 14, 1903. Serial No. 173,159. (No model.)

*To all whom it may concern:*

Be it known that I, WILLIAM W. BROGA, a citizen of the United States of America, residing at Springfield, in the county of Hampden and State of Massachusetts, have invented new and useful Improvements in Snap-Hooks, of which the following is a specification.

This invention relates to snap-hooks, the object of the invention being to provide a hook of this description which cannot accidentally become unsnapped by coming violently into contact with any object nor by being picked up between the teeth of an animal; and the invention consists in the construction set forth in the following specification and clearly pointed out in the claims.

In the drawings forming part of this application, Figure 1 is a side elevation, partly in section, of a hook constructed according to this invention. Fig. 2 is a sectional plan view on line 2 2, Fig. 1. Fig. 3 is a sectional elevation of a rotatable sleeve on the shank of the hook as seen at right angles to the position of the sleeve shown in Fig. 1.

In constructing a hook according to this invention the shank *a* is made straight, with a turned-down portion forming the shoulder *b*, the hook end *c* being made separate and secured to the upper end of the shank in any suitable manner in the position shown in Fig. 1. The shank is provided with the usual eye *d*, by which to attach it to a strap or cord. The shank is bored out axially from its upper end, and through one wall thereof the vertically-disposed slot *e* is cut. In the hole bored in the shank a bolt *f* is inserted, and through the slot *e* a pin *g* is driven into a suitable hole in the bolt, the pin being just long enough so that its outer end may project beyond the wall of the shank. On the shank is fitted a sleeve *h*, the internal diameter of one end of which is greater for about half the length of the sleeve than the diameter of the other portion. This sleeve extends normally from the under side of the hook to the shoulder *b*, and within the wall of that portion of the sleeve having the smallest internal diameter a spiral groove *i* is formed, which, as shown in Fig. 1, runs out at the shoulder *j*. Between that shoulder and the shoulder *b* on the shank a spiral spring *k* is located, which when the sleeve *h* is rotated will be compressed and when the sleeve is released will assist in returning the sleeve to its normal position, which is that shown in Fig. 1. If desired, this spring may be loosely applied to the shank *a*, one end being secured to the shank and the other to the sleeve, whereby it may constitute a torsional spring, against which the sleeve may be operated to retract the bolt *f*, the spring acting to return the bolt to its normal position by its reaction.

In assembling the parts the bolt is first placed in the shank. The pin *g* is then driven into the bolt through the slot *e*, which secures the bolt permanently within the shank and permits it to move vertically therein. The spring *k* is then applied to the lower end of the shank and the sleeve *h* slipped over the latter, the open end of the spiral groove *i* being started on the pin *g* and the sleeve rotated to locate it in its normal position, as shown in Fig. 1. The hook end *c* is then fitted over the end of the shank, and the bolt is retracted and the upper end of the shank headed over to secure the hook therein.

Having thus described my invention, what I claim, and desire to secure by Letters Patent of the United States, is—

1. A snap-hook consisting of a body portion having a hook at one end, and a straight, hollow, vertically-slotted shank portion; a plunger in the shank, a sleeve loose on the shank, and a pin in the plunger extending through the slot in the shank, there being an inclined groove in the sleeve to engage said pin, and a suitable spring to hold the plunger normally against the end of the hook.

2. A snap-hook consisting of a body portion having a hook at one end, and a straight, hollow, vertically-slotted shank portion; a plunger in the shank, a sleeve loose on the shank, and a pin in the plunger extending through the slot in the shank; there being an inclined groove in the sleeve to engage said pin, and a suitable spring to force the sleeve in one direction to hold the plunger against the end of the hook.

WILLIAM W. BROGA.

Witnesses:
E. ST. CROIX OLIVER,
JOSEPH D. PARK.